United States Patent
Ishihara et al.

(10) Patent No.: US 10,358,704 B2
(45) Date of Patent: *Jul. 23, 2019

(54) COMPOSITE BODY AND METHOD FOR MANUFACTURING SAME

(71) Applicant: DENKA COMPANY LIMITED, Tokyo (JP)

(72) Inventors: Yosuke Ishihara, Omuta (JP); Takeshi Miyakawa, Omuta (JP); Shinya Narita, Omuta (JP)

(73) Assignee: DENKA COMPANY LIMITED, Tokyo (JP)

(*) Notice: Subject to any disclaimer, the term of this patent is extended or adjusted under 35 U.S.C. 154(b) by 171 days.

This patent is subject to a terminal disclaimer.

(21) Appl. No.: 15/318,138

(22) PCT Filed: Jul. 3, 2015

(86) PCT No.: PCT/JP2015/069254
§ 371 (c)(1),
(2) Date: Dec. 12, 2016

(87) PCT Pub. No.: WO2016/002925
PCT Pub. Date: Jan. 7, 2016

(65) Prior Publication Data
US 2017/0130300 A1    May 11, 2017

(30) Foreign Application Priority Data
Jul. 3, 2014   (JP) .................................. 2014-137373

(51) Int. Cl.
B22F 7/00         (2006.01)
C22C 26/00     (2006.01)
(Continued)

(52) U.S. Cl.
CPC ................ C22C 26/00 (2013.01); C22C 1/05 (2013.01); C22C 21/02 (2013.01); C22C 45/04 (2013.01);
(Continued)

(58) Field of Classification Search
None
See application file for complete search history.

(56) References Cited

U.S. PATENT DOCUMENTS

2004/0062928 A1* 4/2004 Raghavan ................. B22F 7/06
                                                              428/408
2011/0198771 A1   8/2011   Hirotsuru et al.
2014/0182824 A1   7/2014   Hirotsuru et al.

FOREIGN PATENT DOCUMENTS

JP    H09-157773 A    6/1997
JP    2000-303126 A   10/2000
(Continued)

OTHER PUBLICATIONS

Oct. 6, 2015 Search Report issued in International Patent Application No. PCT/JP2015/069254.

*Primary Examiner* — Seth Dumbris
(74) *Attorney, Agent, or Firm* — Oliff PLC

(57) ABSTRACT

A composite is obtained by press-molding a mixed powder comprising 20-50 vol % of a metal powder and 50-80 vol % of a diamond powder for which a first peak in a volumetric distribution of particle size lies at 5-25 μm, and a second peak lies at 55-195 μm, and a ratio between the area of a volumetric distribution of particle sizes of 1-35 μm and the area of a volumetric distribution of particle sizes of 45-205 μm is from 1:9 to 4:6, thereby obtaining a composite having a high thermal conductivity and a coefficient of thermal expansion close to that of semiconductor devices, which is easy to mold into a prescribed shape.

6 Claims, 8 Drawing Sheets

(51) Int. Cl.
  *C22C 1/05*     (2006.01)
  *C22C 21/02*    (2006.01)
  *C22C 45/04*    (2006.01)
  *B22F 1/00*     (2006.01)

(52) U.S. Cl.
  CPC ........... *B22F 1/0003* (2013.01); *B22F 1/0059* (2013.01); *B22F 2998/10* (2013.01); *B22F 2999/00* (2013.01); *Y10T 428/12056* (2015.01); *Y10T 428/12063* (2015.01); *Y10T 428/12069* (2015.01); *Y10T 428/12076* (2015.01); *Y10T 428/12083* (2015.01); *Y10T 428/12889* (2015.01); *Y10T 428/12944* (2015.01)

(56) References Cited

FOREIGN PATENT DOCUMENTS

| | | |
|---|---|---|
| JP | 2007-518875 A | 7/2007 |
| JP | 2012-117085 A | 6/2012 |
| WO | 2005/035808 A2 | 4/2005 |
| WO | 2010/007974 A1 | 1/2010 |
| WO | 2013/015158 A1 | 1/2013 |

\* cited by examiner

[FIG. 1]
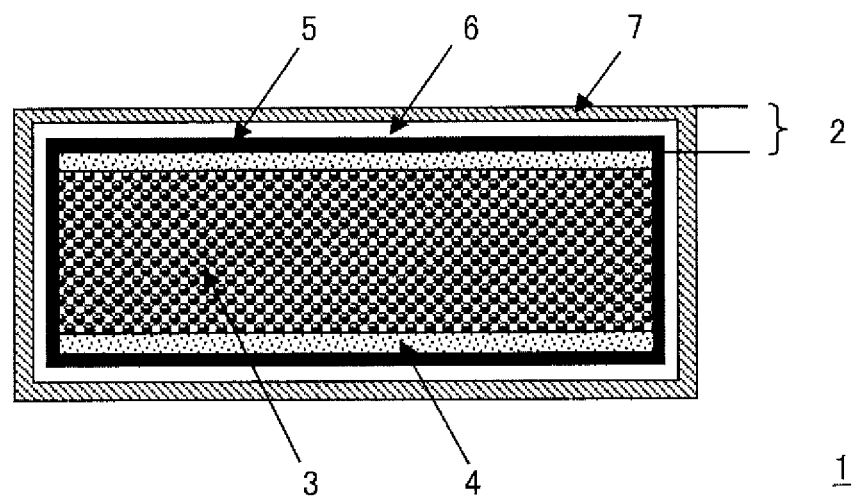

[FIG. 2]
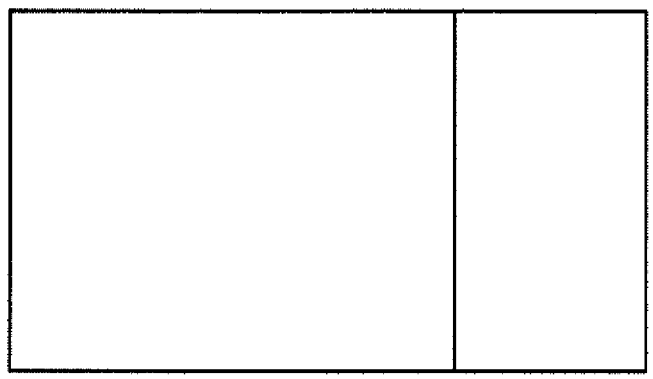

[FIG. 3]

[FIG. 4]
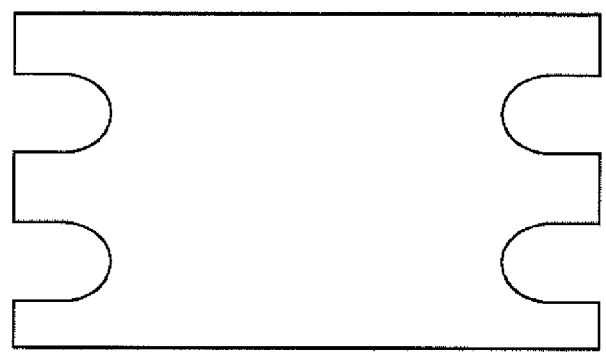

[FIG. 5]
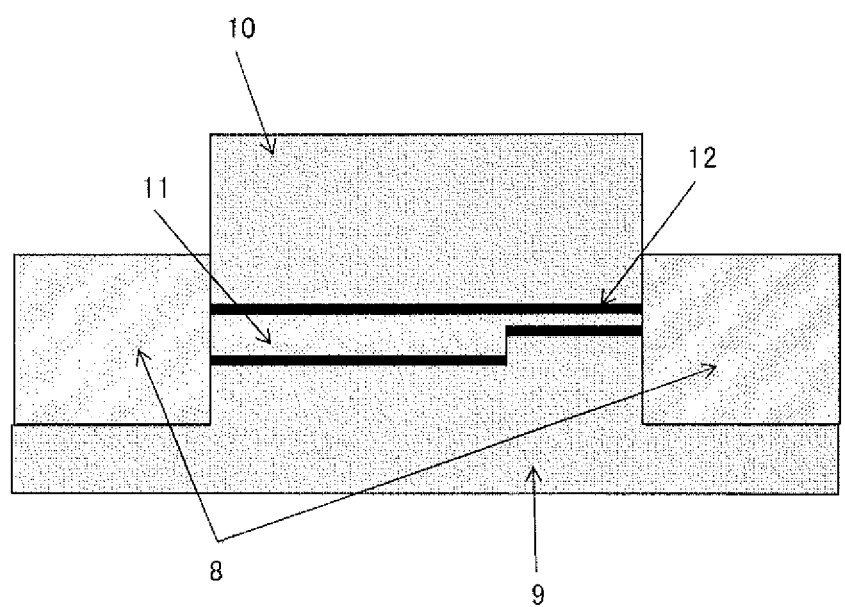

[FIG. 6]
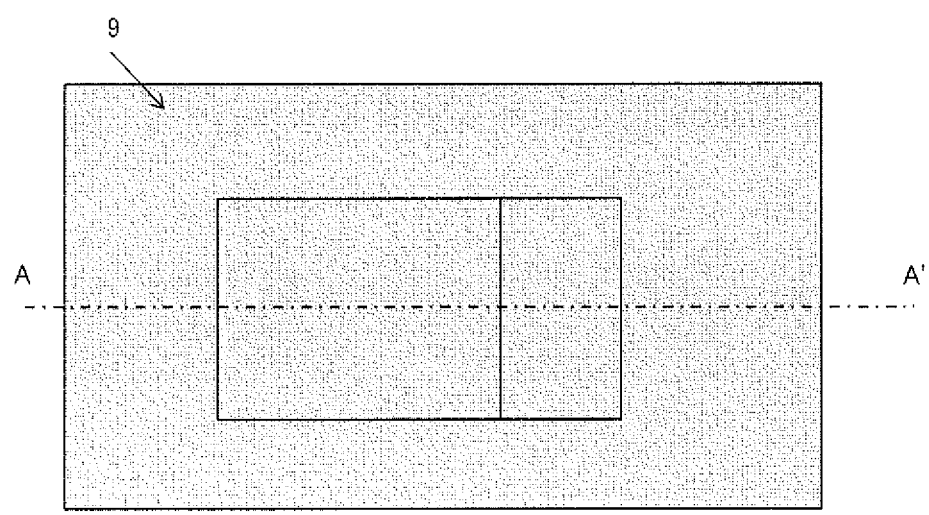

[FIG. 7]
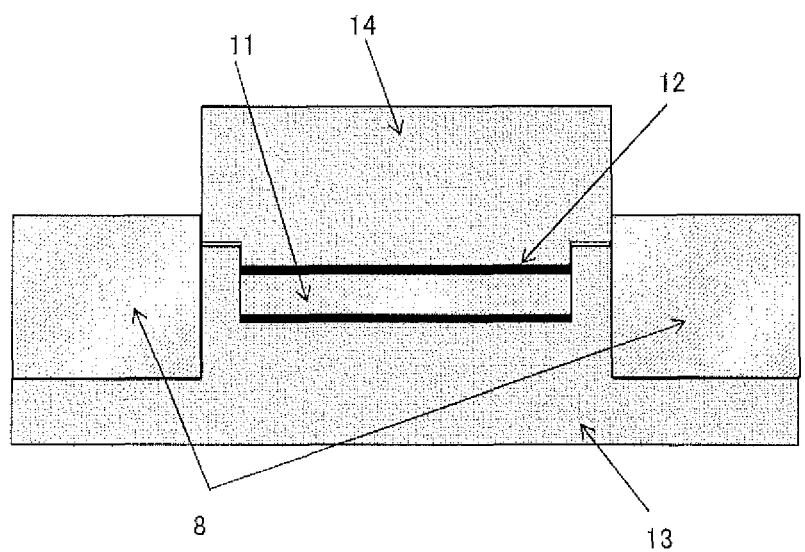

[FIG. 8]
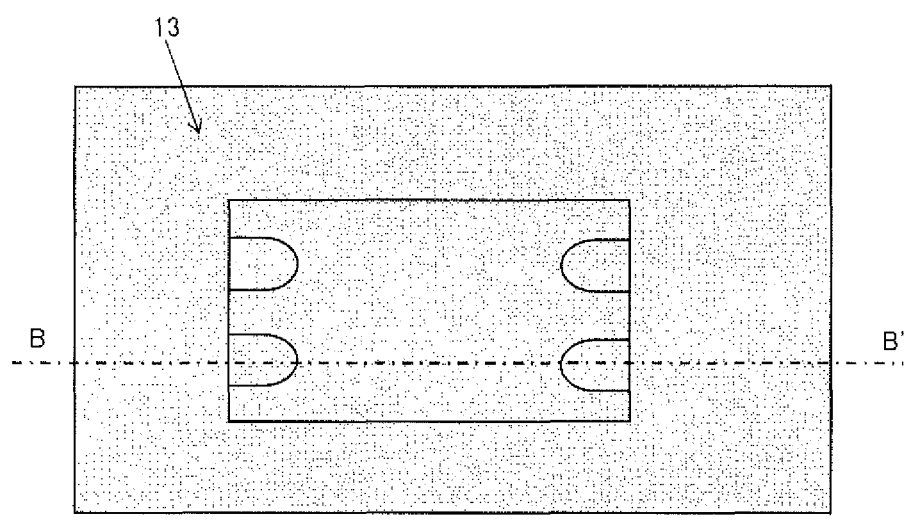

COMPOSITE BODY AND METHOD FOR MANUFACTURING SAME

TECHNICAL FIELD

The present invention relates to a composite and a method for manufacturing the same.

BACKGROUND ART

Generally, in semiconductor devices such as the semiconductor laser devices and RF devices that are used in optical communications and the like, the problem of how to efficiently remove the heat generated by the devices is very important in order to prevent malfunctions or the like. In recent years, advances in semiconductor device technologies have led to higher outputs, higher speeds and higher integration of devices, placing ever stricter demands on their heat dissipation. For this reason, higher thermal conductivity is also generally required in heat-dissipating components such as heat sinks, and copper (Cu), which has a high thermal conductivity of 390 W/mK, is used.

On the other hand, individual semiconductor devices are becoming larger in size with the increased outputs, and the problem of mismatches in the thermal expansion between semiconductor devices and the heat sinks used for heat dissipation has gained prominence. In order to solve this problem, the development of a heat sink material that has the property of high thermal conductivity while also having a coefficient of thermal expansion that matches with that of semiconductor devices has been sought. As such materials, composites of metals and ceramics, for example, composites of aluminum (Al) and silicon carbide (SiC), have been proposed (Patent Document 1).

However, the thermal conductivity of an Al—SiC composite material cannot be lowered to 300 W/mK or less no matter how the conditions are optimized, so the development of a heat dissipating member having even higher thermal conductivity, greater than the thermal conductivity of copper, has been sought. As such a material, a metal-diamond composite that combines the high thermal conductivity possessed by diamonds with the high coefficient of thermal expansion possessed by metals, and thus has high thermal conductivity and a coefficient of thermal expansion close to that of semiconductor device materials, has been proposed (Patent Document 2).

Additionally, in Patent Document 3, a β-type SiC layer is formed on the surfaces of diamond particles, thereby suppressing the generation of metal carbides having low thermal conductivity that are formed at the time of compositing, and improving the wettability with molten metals, thereby improving the thermal conductivity of the resulting metal-diamond composite (Patent Document 3).

Furthermore, since diamond is an extremely hard material, metal-diamond composites that are obtained by compositing diamond with metals are similarly very hard, difficult-to-work materials. For this reason, metal-diamond composites are mostly unworkable using normal diamond machine tools, and when using metal-diamond composites as heat sinks, which are small and have a variety of shapes, the issue of how to shape them at a low cost arises. In response to these issues, machining methods such as laser machining, waterjet machining, and furthermore, since metal-ceramic composites conduct electricity, electrical discharge machining, have been considered.

Patent Document 1: JP H9-157773 A
Patent Document 2: JP 2000-303126 A
Patent Document 3: JP 2007-518875 A

SUMMARY OF THE INVENTION

However, even when using the above-mentioned machining methods, metal-diamond composites have higher machining costs compared to machining with normal diamond machine tools, and have the problems of longer machining times and lower productivity. Additionally, they are difficult to prepare into stepped shapes or complicated shapes.

Furthermore, when a heat sink is to be joined to a semiconductor device by a brazing material or the like, the surface precision of the joint interface is important for the heat dissipation. In the case of a conventional metal-diamond composite, diamond particles will be exposed on the joint surface, so that the joint surface will have a high surface roughness, and as a result, the thermal resistance of the contact interface will unfavorably increase. For this reason, as a property that is sought in heat sink materials, there is the issue of how to reduce the roughness of the surface.

Thus, the purpose of the present invention is to offer a composite having a high thermal conductivity and a coefficient of thermal expansion close to that of semiconductor devices, which is easy to mold into a prescribed shape, and a method for manufacturing the same.

The present invention provides a composite that is obtained by press-molding a mixed powder comprising 20-50 vol % of a metal powder and 50-80 vol % of a diamond powder for which a first peak in a volumetric, distribution of particle size lies at 5-25 μm, and a second peak lies at 55-195 μm, and a ratio between the area of a volumetric distribution of particle sizes of 1-35 μm and the area of a volumetric distribution of particle sizes of 45-205 μm is from 1:9 to 4:6.

According to one embodiment of the present invention, in the composite, the metal powder is an aluminum powder, an aluminum alloy powder, or a mixed powder comprising aluminum and a metal other than aluminum.

According to one embodiment of the present invention, the surface of the composite has, sequentially formed thereon, a metal layer comprising (1) an Ni layer having a film thickness of 0.5-6.5 μm, (2) an amorphous Ni alloy layer having a film thickness of 0.5-6.5 μm, and (3) an Au layer having a film thickness of 0.05-4 μm, wherein the total film thickness of the Ni layer and the amorphous Ni alloy layer is 1.0-10 μm.

The present invention provides a method for manufacturing a composite, comprising the steps of filling a mold with a mixed powder comprising 20-50 vol % of a metal powder and 50-80 vol % of a diamond powder for which a first peak in a volumetric distribution of particle size lies at 5-25 μm, and a second peak lies at 55-195 μm, and a ratio between the area of a volumetric distribution of particle sizes of 1-35 μm and the area of a volumetric distribution of particle sizes of 45-205 μm is from 1:9 to 4:6; heating the mixed powder to a temperature of at least 300° C. and less than 660° C.; and press-molding at a molding pressure of 10-300 MPa for a pressing time of 1-30 minutes.

According to one embodiment of the present invention, in the method for manufacturing a composite, the metal powder is an aluminum powder, an aluminum alloy powder, or a mixed powder comprising aluminum and a metal other than aluminum.

The composite according to the present invention has a high thermal conductivity and a coefficient of thermal expansion close to that of semiconductor devices, and is easy to mold into a prescribed shape. Additionally, the method for manufacturing a composite according to the present invention allows a composite having a high thermal conductivity and a coefficient of thermal expansion close to that of semiconductor devices to be manufactured in a desired shape.

BRIEF DESCRIPTION OF THE DRAWINGS

FIG. 1 A schematic structural diagram of a composite.

FIG. 2 A schematic plan view of a composite having a stepped shape.

FIG. 3 A schematic side view of a composite having a stepped shape.

FIG. 4 A schematic plan view of a composite having a complicated shape.

FIG. 5 An explanatory diagram of a mold used when forming a composite having a stepped shape.

FIG. 6 A schematic plan view of a mold B used when forming a stepped shape.

FIG. 7 An explanatory diagram of a mold used when forming a composite having a complicated shape.

FIG. 8 A schematic plan view of a mold D used when forming a complicated shape.

MODES FOR CARRYING OUT THE INVENTION

Explanation of Terminology

In the present specification, the symbol "-" refers to "equal to or greater than" and "equal to or less than". For example, "A-B" refers to the range of values that are equal to or greater than A and equal to or less than B.

In the present specification, "both surfaces" refers to both the front and rear surfaces of a flat plate-shaped element. Additionally, in the present specification, "side surface portions" refers to portions of a flat plate-shaped element that are approximately perpendicular to both surfaces and are provided about the periphery of both surfaces. Additionally, in the present specification, "hole portion" refers to a through-hole that is machined so as to penetrate through the top and bottom surfaces of a flat plate-shaped composite, provided in order to screw the component of the present embodiment to another heat-dissipating member.

Herebelow, a composite according to the present embodiment and an embodiment of a manufacturing method thereof will be explained by referring to the drawings.

The composite of the present embodiment is obtained by press-molding a mixed powder comprising 20-50 vol % of a metal powder and 50-80 vol % of a diamond powder for which a first peak in a volumetric distribution of particle size lies at 5-25 µm, and a second peak lies at 55-195 µm, and a ratio between the area of a volumetric distribution of particle sizes of 1-35 µm and the area of a volumetric distribution of particle sizes of 45-205 µm is from 1:9 to 4:6.

The composite having the above-described constitution has a high thermal conductivity and a coefficient of thermal expansion close to that of semiconductor devices, and can be molded into a prescribed shape.

Herebelow, the method for manufacturing the composite of the present embodiment will be explained. The composite according to the present embodiment is obtained by press-molding raw materials including a diamond powder and a metal powder at a prescribed temperature and pressure.

[Diamond Powder]

As the diamond powder which is a raw material, either a natural diamond powder or a synthetic diamond powder may be used. Additionally, a binder such as silica, for example, may be added to the diamond powder as needed. By adding a binder, it is possible to obtain the effect of being able to form a molded body.

Regarding the particle size of the diamond powder, there is preferably a first peak in the volumetric distribution of the particle size at 5-25 µm, and a second peak at 55-195 µm, and the ratio between the area of the volumetric distribution of particle sizes of 1-35 µm which includes the first peak and the area of the volumetric distribution of particle sizes of 45-205 µm which includes the second peak is preferably from 1:9 to 4:6.

The particle size distribution measurements are performed using the Coulter method. For example, each diamond powder is added to purified water to produce a slurry as a measurement solution, which is then measured using a spectrophotometer with 1.33 as the refractive index for water and 2.42 as the refractive index for diamond.

The diamond particle content in the composite of the present embodiment is preferably at least 50 vol % and at most 80 vol %. If the diamond particle content is at least 50 vol %, adequate thermal conductivity can be ensured for the resulting composite. Additionally, in view of the filling ability, the diamond particle content should preferably be at most 80 vol %. As long as the content is 80 vol % or less, there is no need to machine the shapes of the diamond particles so as to be spherical or the like, and a composite can be obtained at a stable cost.

A diamond powder having a β-type silicon carbide layer formed on the surfaces of the diamond particles may be used. As a result, it is possible to suppress the generation of metal carbides ($Al_4C_3$) having low thermal conductivity that are formed during compositing, and the wettability with molten aluminum can be improved. As a result, the effect of improving the thermal conductivity of the resulting composite can be obtained.

[Metal Powder]

The metal powder used as a raw material should preferably be an aluminum powder, an aluminum alloy powder, or a mixed powder comprising aluminum and a metal other than aluminum.

The composition of the aluminum alloy powder should preferably be 77-100 mass % aluminum, 0-20 mass % silicon and 0-3 mass % magnesium. The composition of the mixed powder when mixing aluminum and a metal other than aluminum should preferably be 77-100 mass % aluminum, 0-20 mass % silicon and 0-3 mass % magnesium As long as there is 20 mass % or less of the silicon component, then the thermal conductivity of the resulting alloy will not decrease, and the thermal conductivity of the resulting composite will not decrease. The magnesium component has the effect of improving the adhesion between the resulting alloy and silicon carbide, and if the amount is 3 mass % or less, aluminum carbide ($Al_4C_3$) tends not to be produced during compositing, which is favorable in terms of the thermal conductivity and strength. Additionally, other metals such as nickel, cobalt, copper, titanium or steel may also be included, as long as the amount is 1 mass % or less, since the thermal conductivity will not decrease in that case.

As the metal powder, a powder obtained by mixing the above-described aluminum powder, aluminum alloy powder and at least one powder chosen from among the powders of metals other than aluminum may also be used.

The content of these metal powders should preferably be 20-50 vol % with respect to the resulting composite. In this case, the metal powder content (vol %) is calculated as the content (vol %) when the average density of the metal powder is 2.7 $g/cm^3$.

As long as the metal powder content is at least 20 vol %, the amount of the metal powder will be sufficient during hot press-molding and the composite will be sufficiently dense. As long as the metal powder content is 50 vol % or less, a dense composite can be obtained, and the coefficient of thermal expansion of the composite can be suppressed.

Regarding the particle size of the metal powder, the average particle size should preferably be approximately 10-100 µm. As long as the average particle size is at least 10 µm, densification is promoted by oxidation of the metal particle surface. Additionally, as long as the average particle size is 100 µm or less, densification of the metal particles will not tend to be inhibited by creep deformation.

Regarding the method of mixing the raw material powder, there are no particular restrictions as long as the method allows each raw material to be uniformly mixed. Mixing with a ball mill or mixing with a mixer is possible. Regarding the mixing time, a period of time such that oxidation and pulverization of the raw material powder does not progress is preferable, and while the time will also depend on the mixing method and the loaded amount, a time of about 15 minutes to 5 hours is preferable. As long as the mixing time is within this range, inadequate composite densification and non-uniformity of the composite organization can be suppressed, and decreases in the thermal conductivity of the composite due to oxidation of the raw material powder and reductions in the size of the powder due to pulverization can be suppressed.

Additionally, a binder or the like for shape retention may be used as needed, as long as it can be removed in the heating stage during hot press-molding.

As the mold used for press-molding in the present embodiment, it is possible to use iron materials such as cast iron or stainless steel, or ceramics such as silicon nitride in view of their strength. Additionally, a graphite mold may also be used. The mold may be used by coating the surface with a mold release agent, in view of the mold release properties with respect to the composite obtained by press-molding. As the mold release agent, graphite, alumina, boron nitride and the like are suitable mold release agents. Additionally, by applying the mold release agent after forming a thin film of alumina or the like on the mold, exceptional mold release properties can be obtained and the life span of the mold can be extended. Additionally, a mold release plate such as a graphite sheet can be used between the mold and the product as needed.

Regarding the structure of the mold, it should preferably be composed of an inner mold and upper and lower punches, which determine the external shape of the composite when molded.

During press-molding, a mixed powder of a metal powder and a diamond powder is loaded into the mold as described above, and heated to a temperature lower than the melting point of the metal powder being used. The heating temperature is preferably 300-660° C., and more preferably 550-650° C. As long as the heating temperature is at least 300° C., the metal powder will be easy to deform and the densification of the composite will be promoted. As long as the heating temperature is 660° C. or less, variations in the properties such as thermal conductivity and strength due to leakage of aluminum during molding will not tend to occur.

When loading the mixed powder into a mold to produce a molded body, the preliminary molding pressure should preferably be 10-300 MPa and the pressing time should preferably be 1-30 minutes.

As long as the pressure during preliminary molding is at least 10 MPa, the densification will be sufficient. Regarding the upper limit for the press pressure, there are no restrictions in terms of the properties, but the pressure should preferably be 300 MPa or less in view of the strength of the mold and the power of the device. Setting the pressing time to at least 1 minute results in sufficient densification. Additionally, regarding the upper limit for the pressing time, there are no restrictions in terms of the properties, but the time should preferably be 30 minutes or less in consideration of the production efficiency and the possibility of malfunction of the device and the mold.

By means of the above-described press-molding, a plate-shaped composite having a thickness of 0.4-6 mm, wherein the raw material mixed powder is densified, is obtained. For use as a heat sink or the like, the thickness of the composite should preferably be at least 0.4 mm, and the thickness should preferably be 6 mm or less when considering the cost of the material and the thermal conductivity.

Next, the method of formation of a composite having a stepped shape as shown in FIG. 2 or 3 shall be explained. As the formation method for a composite having such a shape, the composite can be easily formed, for example, by using a mold B (reference number 9 in FIG. 5 and FIG. 6) having a lower punch that is provided with a desired stepped recess at a location where a protrusion is to be finally formed, and a mold C (reference number 10 in FIG. 5) having an upper punch that lacks recesses or protrusions.

Additionally, the method of formation of a composite provided with a hole portion, a cutout or the like shall be explained. When using a composite as a heat sink for a semiconductor device, there are cases in which a complicated shape is needed for a cutout or a hole portion for fastening screws.

Composites are extremely hard, difficult-to-work materials, and if they are machined in order to form complicated shapes or hole portions such as in FIG. 4 by laser machining or waterjet machining, the machining costs can become expensive.

As the method for forming a composite provided with a cutout, for example, it is possible to use a mold D (reference number 13 in FIGS. 7 and 8) provided with a lower punch of a desired shape and a mold E (reference number 14 in FIG. 7) provided with slits in the same shape as the tower punch.

Additionally, as the method for forming the hole portions, they can be easily formed, for example, by arranging pins at locations where holes will finally be needed in the lower punch of a mold, and providing slits at positions in the upper punch corresponding to the pin positions in the lower punch.

Regarding the material of the pins arranged on the mold, it must have a melting point that is at least as high as the hot molding temperature, and it may be a metal material such as stainless steel or die steel, or a ceramic material such as silicon nitride, aluminum nitride or alumina, but the material should preferably have exceptional wear resistance since the diamond that is used as a raw material in the present embodiment is hard.

For this reason, the pins are preferably affixed to the mold in a detachable manner such as by screw-fastening, since this makes them easier to exchange when they become worn. Regarding the pin diameters, they need to be designed by considering the coefficient of thermal expansion of the material used for the pins, so as to take into account the amount of contraction of the holes when cooled, in view of the coefficient of thermal expansion of the pins and the coefficient of thermal expansion of the composite during hot molding.

Regarding the shapes of the pins, they should preferably be provided with a draft gradient of 1°-5° for removal of the composite after hot molding. As long as the draft gradient is at least 1°, it is possible to suppress the occurrence of cracks in the vicinity of the pin portions when removing the composite. As long as the draft gradient is 5° or less, the hole size difference between the main surfaces of the composite will not be large, and the occurrence of positional misalignment and insufficient tightening force at the time of installation can be suppressed.

The clearance between the pins and the slits in the upper and lower molds should preferably be in the range of 0.01-1.0 mm. As long as the clearance between the pins and the slits in the upper and lower molds is at least 0.01 mm, when there is a temperature difference between the upper and lower molds, it is possible to prevent situations in which the slit diameter becomes smaller than the pin diameter and the pins and slits come into contact during hot molding, thereby causing deterioration of the mold. Additionally, as long as the clearance between the pins and the slits in the upper and lower molds is 1 mm or less, the strength in the area of the hole portions can be maintained without lowering the density around the holes in the composite.

After press-molding, the composite is cooled to room temperature. An annealing process may also be performed after press-forming for the purpose of removing strain that has been introduced during compositing.

The annealing process that is performed for the purpose of removing the strain introduced during compositing is preferably carried out for at least 10 minutes at a temperature of 400-550° C. As long as the annealing temperature is at least 400° C., the strain inside the composite will be adequately released, thereby preventing changes to the shape due to heat treatments after machining. As long as the annealing temperature is at most 550° C., the aluminum alloy in the composite can be prevented from melting.

As long as the annealing time is at least 10 minutes, the strain inside the composite will be adequately released at the above-mentioned annealing temperatures, so changes in the coefficient of thermal expansion and the size can be suppressed. When the above-mentioned conditions are satisfied, sufficient annealing effects can be obtained even when cooling is performed directly after press-forming.

[Heat-Dissipating Component]

When the composite of the present embodiment is to be used as a heat-dissipating component, as shown in FIG. 1, it may be prepared as a heat-dissipating component 1 comprising a composited portion (reference number 3 in FIG. 1), and a surface layer 4 and a surface metal layer 2 comprising an Ni layer 5, an amorphous Ni alloy layer 6 and an Au layer 7 provided on both surfaces of the composited portion 3.

[Surface Layer]

When one or both surfaces of a composite are covered by a surface layer having aluminum as the main component, the composite is suitable for plating.

The material of the surface layer is preferably aluminum or an aluminum alloy that easily adheres to the composite, and by press-forming at a temperature in the range from a temperature that is 100 K lower than the melting point thereof up to but not including the melting point, an aluminum or aluminum alloy foil or plate having a thickness of 0.01-1 mm can be composited onto the surface of the composite.

[Metal Layer]

When using the composite of the present embodiment as a heat sink for a semiconductor device, it will often be used by joining to a semiconductor device by brazing. Therefore, the joint surface of the composite should preferably be provided with a metal layer. As the method for forming the metal layer, a method such as plating, vapor deposition or sputtering may be used. Plating is preferred in view of the cost, and a process using plating will be explained below.

The surface of the composite is preferably plated with crystalline Ni to a film thickness of 0.5-6.5 μm. As long as the film thickness of the Ni plating is at least 1 μm, pinholes (unplated portions) will tend not to be formed on the plating film, and as long as the thickness is 5 μm or less, residual stress will not tend to be generated in the plating film, and problems such as swelling, peeling or cracking of the plating film will not tend to occur as a result of the temperature load during actual use.

While the plating method is preferably an electroplating method, an electroless plating method may be applied as long as a crystalline Ni plating film can be obtained.

When providing Ni plating on aluminum, a pretreatment should preferably be performed, and substitution with zinc which has excellent plating adhesion is preferred. Regarding the adhesion of the Ni plating, the peel strength should preferably be at least 5 kgf/cm, and more preferably at least 8 kgf/cm.

As long as the peel strength is at least 5 kfg/cm, problems of peeling of the plating layer due to the temperature load during actual use will tend not to occur when used as a heat-dissipating component in a semiconductor device.

The above-described Ni-plated surface is preferably further plated with an amorphous (non-crystalline) Ni alloy having a film thickness of 0.5-6.5 μm. When an amorphous Ni alloy is plated by electroplating, pinholes (unplated portions) will be formed due to the plating film not being formed over diamond particles that are exposed on the side surfaces, so an electroless plating method is preferred.

In this case, the amorphous Ni alloy plating should preferably be alloy plating which comprises Ni and 5-15 mass % of phosphorous (P). As long as the film thickness of the amorphous Ni alloy plating is at least 0.5 μm, pinholes (unplated portions) will tend not to be formed in the plating film, and as long as the film thickness is at most 6.5 μm, residual stresses generated in the plating film will not increase, and swelling, peeling and cracking will not tend to occur as a result of the temperature load during actual use.

Additionally, as the joining temperature rises and the temperature load during actual use increases, the amorphous Ni alloy plating can crystallize, and the change in volume at that time can cause problems such as generation of microcracks and the cracks can be extended by subsequent temperature loads, so the amorphous Ni alloy plating layer preferably has a thickness of 0.5-2 μm.

When using the composite of the present embodiment as a heat-dissipating component in a high-output semiconductor device, as the joining temperature rises and the temperature load increases during actual use, swelling may occur due to the thermal expansion difference between the plating film and the surface layer which is mainly composed of aluminum, but swelling due to the temperature load during actual use can be suppressed by forming an Ni plating layer which has a smaller thermal expansion difference with respect to the surface layer, which is mainly composed of aluminum, than the amorphous Ni alloy plating layer.

Furthermore, the total thickness of the Ni plating layer and the amorphous Ni alloy plating layer is preferably thin, and specifically, a thickness of 1.0-10 μm is preferred. Within this range, the generation of pinholes and swelling during actual use can be suppressed.

When the composite of the present embodiment is to be joined to a brazing material at a high temperature, the outermost surface should preferably be plated with Au to a film thickness of 0.05-4 μm by electroplating or electroless plating. As long as the plating film thickness of the Au plating is at least 0.05 μm, the joint will be sufficient, and while there are no restrictions in terms of the properties, the film thickness should preferably be 4 μm or less in view of the cost.

Additionally, the composite of the present embodiment preferably has a thermal conductivity of at least 350 W/mK when the temperature of the composite is 25° C., and preferably has a coefficient of thermal expansion of 4-10×10⁻⁶/K from 25° C. to 150° C.

As long as the thermal conductivity is at least 350 W/mK at 25° C., and the coefficient of thermal expansion is 4-10×10⁻⁶/K from 25° C. to 150° C., a high thermal conductivity and a low coefficient of thermal expansion that is of about the same level as semiconductor devices is obtained. For this reason, when the composite is used as a heat-dissipating component in a heat sink or the like, excellent heat dissipation properties are obtained, and even when subjected to temperature changes, the difference in the coefficient of thermal expansion between the semiconductor device and the heat-dissipating component will be small, so that the destruction of the semiconductor device can be suppressed. As a result, the composite can be favorably used as a highly reliable heat-dissipating component.

The composite of the present embodiment has a high thermal conductivity and a low coefficient of thermal expansion of about the same level as semiconductor devices, and is therefore suitable for use as a heat-dissipating component in semiconductor laser devices or RF devices requiring high outputs, such as those using GaN, GaAs and SiC. In particular, the composite is suitable for use as a heat-dissipating component in GaAs-HEMT devices or GaN-HEMT devices, which are types of RF devices.

The composite according to the above-described embodiment has a high thermal conductivity and a coefficient of thermal expansion close to that of semiconductor devices, and can be easily molded into a prescribed shape and allows hole portions or cutouts to be easily formed. For this reason, it can be favorably used as a heat-dissipating component such as a heat sink for heat dissipation.

EXAMPLES

Examples 1-6, Comparative Examples 1 and 2

A mixed powder, obtained by mixing a high-purity diamond powder A (manufactured by Diamond Innovations, average particle size 150 μm) and a high-purity diamond powder B (manufactured by Diamond Innovations, average particle size 10 μm), which are commercially available, at a mass ratio of 7:3, was mixed with an aluminum powder (manufactured by Alcoa, average particle size 25 μm), at the blending ratios shown in Table 1.

Upon measuring the particle size distribution of the mixed powder of diamond powder A and diamond powder B, the volumetric distribution had a first peak at 10 μm and a second peak at 150 μm, and the ratio between the area of the volumetric distribution from 1-35 μm to the area of the volumetric distribution from 45-205 μm was 3:7. The particle size distribution measurements were made by adding the diamond powders to purified water to produce a slurry as the measurement solution, which was measured using a spectrophotometer (manufactured by Beckman Coulter, Coulter LS230) with 1.33 as the refractive index of water and 2.42 as the refractive index of diamond.

TABLE 1

|  | Blending Ratio (vol %) | |
| --- | --- | --- |
|  | Diamond Powder | Aluminum Powder |
| Example 1 | 61 | 39 |
| Example 2 | 50 | 50 |
| Example 3 | 65 | 35 |
| Example 4 | 70 | 30 |
| Example 5 | 80 | 20 |
| Example 6 | 65 | 35 |

TABLE 1-continued

|  | Blending Ratio (vol %) | |
| --- | --- | --- |
|  | Diamond Powder | Aluminum Powder |
| Comparative Example 1 | 45 | 55 |
| Comparative Example 2 | 85 | 15 |

Next, a cast iron mold A 8 (outer dimensions 250×200×50 mm, inner dimensions 25.0×25.0×50 mm) and a mold B 9 (lower part 250×200×20 mm, upper part 24.9×24.9×10 mm), as shown in FIG. 5, were coated with graphite and boron nitride as mold release agents, after which the molds were stacked and pure aluminum foil (100 μm) was disposed on the surfaces towards the molds B and C, and graphite sheets for mold release were disposed between the mold B 9 and mold C 10 and the pure aluminum foil, thereby forming a molded body composed of the mixed powder and aluminum foil.

A mold C 10 (24.9×24.9×60 mm) that was similarly coated with a mold release agent was stacked thereon, and preliminary molding was performed at a surface pressure of 50 MPa using a hydraulic press.

Next, in an electric furnace, this stacked body was heated to a temperature of 610° C. in an air atmosphere, then held for 15 minutes to make the temperature of the stacked body 610° C. The heated stacked body was hot-molded for 5 minutes at a surface pressure of 250 MPa using a hydraulic press interposed by a thermal insulation material having a thickness of 5 mm, then the pressure was released and the stacked body was cooled to room temperature.

Next, the mold B 9 was removed, the mold C 10 was pressed using the hydraulic press, and the molded body was extracted, after which the graphite sheets provided for mold release were stripped to obtain a stepped composite with dimensions of 25×25×2 mm.

Then, a metal file was used to remove burrs formed on the peripheral portions. The density of the resulting composite was measured by the Archimedean method, and the results of calculation of relative density (measured density÷theoretical density×100) are shown in Table 2.

In Comparative Example 2, the aluminum leaked from the mold during pressing, and this caused a change in the ratio of diamond to aluminum, so no further measurements were made.

TABLE 2

|  | Relative Density (%) | Thermal Conductivity (W/mK) | Coefficient of Thermal Expansion (×10⁻⁶/K) |
| --- | --- | --- | --- |
| Example 1 | 97.5 | 560 | 7.5 |
| Example 2 | 97.3 | 480 | 8.4 |
| Example 3 | 97.5 | 580 | 6.1 |
| Example 4 | 97.2 | 590 | 5 |
| Example 5 | 97.6 | 640 | 4.7 |
| Example 6 | 97.6 | 590 | 6.4 |
| Comparative Example 1 | 97.5 | 300 | 14 |
| Comparative Example 2 | aluminum leak | — | — |

From the resulting composites, samples (diameter 10 mm, thickness 2 mm) for measuring the thermal conductivity in the plate thickness direction and samples (4×2×20 mm) for measuring the coefficient of thermal expansion were prepared using a waterjet cuter (manufactured by Sugino Machine, Abrasive Jet Cutter NC) at a pressure of 250 MPa and a processing speed of 50 mm/min, using garnets with a particle size of 100 μm as polishing abrasive particles.

Using the respective test pieces, the coefficient of thermal expansion for temperatures of 25-150° C. was measured using a thermal expansion meter (manufactured by Seiko Electronics, TMA300), and the thermal conductivity at 25° C. was measured by the laser flash method (Rigaku LF/TCM-8510B). The results thereof are shown in Table 2. Comparative Example 1 was not able to obtain properties suitable for the present application due to having a tow thermal conductivity and a high coefficient of thermal expansion.

Additionally, after ultrasonic cleaning of the above-described composites, and after a pretreatment with a Zn catalyst, Ni electroplating, Ni—P electroless plating and Au electroplating were performed, so as to form 6 μm-thick (Ni: 2.0 μm Ni—P 2.0 μm+Au: 2.0 μm) plating layers on the surfaces of the composites according to Examples 1-4.

Upon measuring the resulting plated products for solder wet-spreading rate in accordance with the JIS Z3197 standard, the solder wet-spreading rate was at least 80% in all of the plated products. Additionally, upon measuring the peel strengths of the resulting plated products, the peel strength was at least 98 N/cm in all of the plated products. Furthermore, upon observing the plated surfaces of the resulting plated products after undergoing a heat treatment for 10 minutes at a temperature of 400° C. in an air atmosphere, no abnormalities such as swelling were observed.

As shown in Table 2, the composites according to Examples 1-6 had a high thermal conductivity and a coefficient of thermal expansion close to that of semiconductor devices. Additionally, when the composites were prepared by these methods, it was possible to reduce the cost as compared to the case wherein flat plate-shaped composites are produced by means of liquid-metal forging or the like, and then shaped by waterjet machining or laser machining.

Examples 7 and 8, Comparative Examples 3 and 4

Composites were prepared by the same method as in Example 1, except that the commercially available high-purity diamond powder A (manufactured by Diamond Innovations, average particle size 150 μm), high-purity diamond powder B (manufactured by Diamond Innovations, average particle size 10 μm), and aluminum powder (manufactured by Alcoa, average particle size 25 μm) were mixed at the blending ratios shown in Table 3.

Upon measuring the particle size distribution of the mixed powder of diamond powder A and diamond powder B, the volumetric distribution had a first peak at 10 μm and a second peak at 150 μm, and the ratios between the area of the volumetric distribution from 1-35 μm to the area of the volumetric distribution from 45-205 μm were as shown in Table 3. The particle size distribution measurements were made by adding the diamond powders to purified water to produce a slurry as the measurement solution, which was measured using a spectrophotometer (manufactured by Beckman Coulter, Coulter LS230) with 1.33 as the refractive index of water and 2.42 as the refractive index of diamond.

Property evaluations similar to those for Example 1 were performed on the resulting composites. The results are shown in Table 4. Comparative Examples 3 and 4 had a low thermal conductivity and a high coefficient of thermal expansion.

TABLE 4

|  | Relative Density (%) | Thermal Conductivity (W/mK) | Coefficient of Thermal Expansion ($\times 10^{-6}$/K) |
| --- | --- | --- | --- |
| Example 7 | 97.5 | 500 | 7.1 |
| Example 8 | 97.5 | 510 | 7 |
| Comparative Example 3 | 90 | 300 | 11.1 |
| Comparative Example 4 | 87 | 280 | 12.5 |

Examples 9-14, Comparative Examples 5-10

A mixed powder, obtained by mixing a high-purity diamond powder A (manufactured by Diamond Innovations, average particle size 150 μm) and a high-purity diamond powder B (manufactured by Diamond Innovations, average particle size 10 μm), which are commercially available, at a mass ratio of 7:3, was mixed with an aluminum powder (manufactured by Alcoa, average particle size 25 μm), at the same blending ratio as in Example 1 (diamond powder: aluminum powder=61:39).

Next, a cast iron mold A (outer dimensions 250×200×50 mm, inner dimensions 25.0×25.0×50 mm) and a mold D (lower part 250×200×20 mm, upper part 24.9×24.9×10 mm), as shown in FIG. 7, were coated with graphite and boron nitride as mold release agents, after which the molds were stacked and pure aluminum foil (100 μm) was disposed on the surfaces towards the molds D and E, and graphite sheets for mold release were disposed between the mold D and mold E and the pure aluminum foil, thereby forming a molded body composed of the mixed powder and aluminum foil.

A mold E (24.9×24.9×60 mm) that was similarly coated with a mold release agent was stacked thereon, and preliminary molding was performed at a surface pressure of 50 MPa using a hydraulic press.

Next, in an electric furnace, this stacked body was hot-molded in an air atmosphere under the conditions shown in Table 5, after which the pressure was released and the stacked body was cooled to room temperature. Next, the mold D was removed, the mold E was pressed using the hydraulic press, and the molded body was extracted, after which the graphite sheets provided for mold release were

TABLE 3

|  | Diamond Powder Blending Ratio | | Blending Ratio (vol %) | | Mixed Diamond Powder Volumetric Distribution Area Ratio | |
| --- | --- | --- | --- | --- | --- | --- |
|  | Powder A | Powder B | Diamond Powder | Aluminum Powder | First Peak | Second Peak |
| Example 7 | 9 | 1 | 55 | 45 | 1 | 9 |
| Example 8 | 6 | 4 | 58 | 42 | 4 | 6 |
| Comparative Example 3 | 10 | 0 | 61 | 39 | 0 | 10 |
| Comparative Example 4 | 3 | 7 | 61 | 39 | 7 | 3 | stripped to obtain a composite with a complicated shape having dimensions of 25×25×2 mm.

TABLE 5

|  | Press Temperature (° C.) | Press Time (min) | Press Pressure (MPa) |
|---|---|---|---|
| Example 9 | 650 | 5 | 250 |
| Example 10 | 300 | 5 | 250 |
| Example 11 | 610 | 1 | 250 |
| Example 12 | 610 | 30 | 250 |
| Example 13 | 610 | 5 | 10 |
| Example 14 | 610 | 5 | 250 |
| Comparative Example 5 | 670 | 5 | 250 |
| Comparative Example 6 | 290 | 5 | 250 |
| Comparative Example 7 | 610 | 0.5 | 250 |
| Comparative Example 8 | 610 | 40 | 250 |
| Comparative Example 9 | 610 | 5 | 5 |
| Comparative Example 10 | 610 | 5 | 350 |

Additionally, property evaluations similar to those for Example 1 were performed on the resulting composites. The results are shown in Table 6. The composites according to Examples 9-14 have a high thermal conductivity and a coefficient of thermal expansion close to that of semiconductor devices. In Comparative Example 5, the aluminum leaked from the mold during pressing, and this caused a change in the ratio of diamond to aluminum, so no further measurements were made. Additionally, Comparative Examples 6, 7 and 9 were not able to obtain properties suitable for the present application due to having a low thermal conductivity and a high coefficient of thermal expansion. Comparative Examples 8 and 10 obtained properties that are suitable for the present application, but chipping and deformation of the molds were observed, so these were found to have poor performance in terms of productivity.

TABLE 6

|  | Relative Density (%) | Thermal Conductivity (W/mK) | Coefficient of Thermal Expansion (×10$^{-6}$/K) |
|---|---|---|---|
| Example 9 | 97.6 | 567 | 7.7 |
| Example 10 | 97.5 | 565 | 7.5 |
| Example 11 | 97.3 | 550 | 7.8 |
| Example 12 | 97.6 | 555 | 7.8 |
| Example 13 | 96.8 | 540 | 7.9 |
| Example 14 | 97.7 | 560 | 7.5 |
| Comparative Example 5 | — | — | — |
| Comparative Example 6 | 85 | 280 | 12 |
| Comparative Example 7 | 90 | 300 | 11.6 |
| Comparative Example 8 | 97.8 | 560 | 7.4 |
| Comparative Example 9 | 90 | 310 | 11.7 |
| Comparative Example 10 | 97.5 | 566 | 7.9 |

Additionally, when the composites were prepared by these methods, it was possible to produce flat plate-shaped composites by means of liquid-metal forging or the like, and to reduce the cost as compared to the case of shaping by waterjet machining or laser machining.

Examples 15-17 and Comparative Examples 11-14

Composites were prepared in the same manner as Example 1, with the exception that 55 vol % of the mixed powder of commercially available high-purity diamond powders and 45 vol % of the aluminum powder (manufactured by Alcoa, average particle size 25 μm) were mixed.

The results of particle size distribution measurements of the diamond powder and mixed powder that were used are shown in Table 7.

TABLE 7

|  | Mixed Diamond Powder | | | |
|---|---|---|---|---|
|  | First Peak (μm) | Second Peak (μm) | Volumetric Distribution Area Ratio | |
|  |  |  | First Peak | Second Peak |
| Example 15 | 5 | 100 | 4 | 6 |
| Example 16 | 30 | 200 | 4 | 6 |
| Example 17 | 1 | 50 | 4 | 6 |
| Comparative Example 11 | 10 | 40 | 4 | 6 |
| Comparative Example 12 | 10 | 220 | 4 | 6 |
| Comparative Example 13 | 40 | 150 | 4 | 6 |
| Comparative Example 14 | 0.5 | 150 | 4 | 6 |

Additionally, property evaluations similar to those for Example 1 were performed on the resulting composites. The results are shown in Table 8.

The composites according to Examples 15-17 were found have a high thermal conductivity and a coefficient of thermal expansion close to that of semiconductor devices,

TABLE 8

|  | Relative Density (%) | Thermal Conductivity (W/mK) | Coefficient of Thermal Expansion (×10$^{-6}$/K) |
|---|---|---|---|
| Example 15 | 97.3 | 530 | 8 |
| Example 16 | 97.4 | 525 | 8.1 |
| Example 17 | 97.3 | 528 | 7.8 |
| Comparative Example 11 | — | — | — |
| Comparative Example 12 | — | — | — |
| Comparative Example 13 | — | — | — |
| Comparative Example 14 | — | — | — |

On the other hand, in Comparative Examples 11-14, the aluminum leaked from the mold during pressing, and this caused a change in the ratio of diamond to aluminum, so no further measurements were made.

DESCRIPTION OF THE REFERENCE NUMBERS

1 heat-dissipating component
2 surface metal layer
3 composite
4 surface layer
5 Ni layer
6 amorphous Ni alloy layer
7 Au layer
8 mold A
9 mold B
10 mold C
11 mixed powder of metal powder and diamond powder
12 graphite sheet
13 mold D
14 mold E

The invention claimed is:
1. A composite obtained by press-molding a mixed powder comprising 20-50 vol % of an aluminum powder and 50-80 vol % of a diamond powder for which a first peak in a volumetric distribution of particle size lies at 5-25 μm, and a second peak lies at 55-195 μm, and a ratio between the area of a volumetric distribution of particle sizes of 1-35 µm and the area of a volumetric distribution of particle sizes of 45-205 µm is from 1:9 to 4:6.

2. A heat-dissipating component for use in semiconductor devices, having sequentially formed, on the surface of the composite as in claim 1, a metal layer comprising (1) an Ni layer having a film thickness of 0.5-6.5 µm, (2) an amorphous Ni alloy layer having a film thickness of 0.5-6.5 µm, and (3) an Au layer having a film thickness of 0.05-4 µm, wherein the total film thickness of the Ni layer and the amorphous Ni alloy layer is 1.0-10 µm.

3. The heat-dissipating component for use in semiconductor devices according to claim 2, wherein a surface layer composed of an aluminum powder as a main component is formed between the composite and the metal layer.

4. The heat-dissipating component for use in semiconductor devices according to claim 3, wherein the Ni layer is formed on the surface layer, the amorphous Ni alloy layer is formed on the Ni layer, and the Au layer is formed on the amorphous Ni alloy layer.

5. A method for manufacturing a composite, comprising the steps of:
    filling a mold with a mixed powder comprising 20-50 vol % of an aluminum powder and 50-80 vol % of a diamond powder for which a first peak in a volumetric distribution of particle size lies at 5-25 µm, and a second peak lies at 55-195 µm, and a ratio between the area of a volumetric distribution of particle sizes of 1-35 µm and the area of a volumetric distribution of particle sizes of 45-205 µm is from 1:9 to 4:6;
    heating the mixed powder to a temperature of at least 300° C. and less than 660° C.; and
    press-molding at a molding pressure of 10-300 MPa for a pressing time of 1-30 minutes.

6. The method for manufacturing a composite as in claim 5, wherein the aluminum powder is an aluminum alloy powder, or a mixed powder comprising aluminum and a metal other than aluminum.

\* \* \* \* \*